United States Patent [19]

Schmidt

[11] 4,091,000

[45] May 23, 1978

[54] POLYURETHANE ELASTOMERS BASED ON HETEROCYCLIC POLYESTER DIOLS

[75] Inventor: Oskar Schmidt, Kittsee, Austria

[73] Assignee: Lim Holding S.A., Luxembourg, Luxembourg

[21] Appl. No.: 667,294

[22] Filed: Mar. 16, 1976

[30] Foreign Application Priority Data

Mar. 17, 1975 Austria .................................. 2052/75

[51] Int. Cl.² .................. C08G 18/34; C08G 63/16
[52] U.S. Cl. ......................... 260/75 NQ; 260/75 R; 260/75 N
[58] Field of Search ............. 260/75 NK, 75 N, 75 R, 260/75 NQ

[56] References Cited

U.S. PATENT DOCUMENTS

| | | | |
|---|---|---|---|
| 2,973,339 | 2/1961 | Muenster et al. ................. | 260/75 R |
| 2,982,754 | 5/1961 | Sheffer et al. ................... | 260/75 NK |
| 2,999,851 | 9/1961 | Elmer ............................... | 260/75 NK |
| 3,043,807 | 7/1962 | Snyder et al. ................... | 260/75 NK |
| 3,053,805 | 9/1962 | Caldwell et al. ................. | 260/75 R |
| 3,162,616 | 12/1964 | Dombrow et al. ............... | 260/75 R |
| 3,553,172 | 1/1971 | Thoma et al. .................... | 260/75 NK |
| 3,554,951 | 1/1971 | Blomeyer et al. ............... | 260/75 NK |
| 3,716,523 | 2/1973 | Cook ................................ | 260/75 NK |
| 3,824,201 | 7/1974 | McGranaghan et al. ....... | 260/75 NK |
| 3,919,144 | 11/1975 | Formaini et al. ................. | 260/75 N |
| 3,928,377 | 12/1975 | Habermeier ...................... | 260/75 N |
| 3,935,166 | 1/1976 | Kanai et al. ..................... | 260/75 NK |
| 3,954,790 | 5/1976 | Habermeier ...................... | 260/75 N |
| 4,038,255 | 7/1977 | Habermeier ...................... | 260/75 N |

FOREIGN PATENT DOCUMENTS

| | | | |
|---|---|---|---|
| 674,296 | 11/1963 | Canada ............................ | 260/75 NK |
| 1,486,448 | 6/1967 | France ............................. | 260/75 NK |

*Primary Examiner*—H.S. Cockeram
*Attorney, Agent, or Firm*—Karl F. Ross

[57] ABSTRACT

A process for producing polyurethane elastomers in which a polyester diol is formed with a molecular weight between 3000 and 30,000 and is then reacted with a diisocyanate.

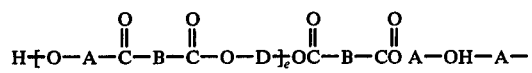

wherein A is D, $-(CH_2)_mO-_n$ or

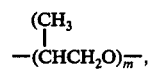

B is $-(CH_2-$ or $-CH=CH-$ and D is a bivalent residue formed by removing the hydroxyl group from one of the following diols:

Bis-[5,5-dimethyl-3-(2-hydroxyethyl)-hydantoinyl]-methane,
Sebacinic acid-di-{1-methyl-2-[3-(2-hydroxyethyl)-4,4-dimethyl-hydantoinyl]}-ethyl ester,
1,3-di-(2-hydroxyethyl)-5,5-dimethyl hydantoin
1,3-di-(2-hydroxyethyl)-benzimidazolone
1,3-di-(2-hydroxyethyl)-4,5,6,7-tetrabromo bezimidazolone
1,3-di-(2-hydroxyethyl-4,5,6,7-tetrahydro-bezimidazolone
Bis-[5,5-dimethyl-3-(2-hydroxypropyl)-hydantoinyl]-methane
1,3-di-(2-hydroxypropyl)-5,5-dimethyl hydantoin or
1,3-di-(2-hydroxypropyl)-benzimidazolone

*e*, *m* and *n* being whole numbers.

3 Claims, No Drawings

POLYURETHANE ELASTOMERS BASED ON HETEROCYCLIC POLYESTER DIOLS

The invention relates to polyurethane elastomers having a Shore A - hardness, measured at 60° C, of 80° and having improved mechanical properties particularly with respect to resistance to continued tearing at 100° C.

Further the invention relates to a process for producing the above-mentioned polymers.

There are known a number of processes which react an aliphatic polyester diol having a molecular weight of about 2000 with a diisocyanate and a chain-lengthening agent comprising a diol of low molecular weight or a diamine or a mixture thereof, respectively.

The influence upon the properties with respect to increased hardness modulus was brought about by increasing the isocyanate proportion as well as by increasing, correspondingly to the mole ratio, the amount of the lengthening component.

The products produced in this way have, however, the disadvantage that the urethane groups, which are formed in increased number, exhibit in the case of dynamically loaded articles a disadvantageous effect in that the instability of these groups at elevated temperatures leads to a rapid wear or destruction of those articles.

To counter this disadvantage according to the present invention a polyester diol having a higher molecular weight is used in which the cyclic portions, which are needed to achieve enhanced hardness and modules, are already incorporated, preferably as a polyester diol, thus corresponding to the following formula I:

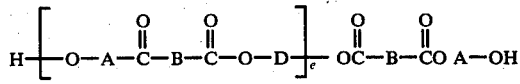

wherein A may be D, $+(CH_2)_mO+_n$ or

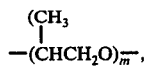

B may be $+CH_2+_m$ or $-CH=CH-$ and D may be a bivalent residue resulting from the removal of a hydroxyl group from one of the following diols:
Bis-[5,5-dimethyl-3- (2-hydroxyethyl)-hydantoinyl]-methane,
Sebacinic acid-di-{1-methyl-2-[3-(2-hydroxyehtyl]-4,4-dimethyl-hydantoinyl}-ethyl ester,
1,3-di-(2-hydroxyethyl)-5,5-dimethyl hydantoine,
1,3-di-(2-hydroxyethyl)-benzimidazolone,
1,3-di-(2-hydroxyethyl)-4,5,6,7-tetrabromo benzimidazolone,
1,3-di-(2-hydroxyethyl)-4,5,6,7-tetrahydro-benzimidazolone,
Bis-[5,5-dimethyl-3-(2-hydroxypropyl)-hydantoinyl]-methane,
1,3-di-(2-hydroxypropyl)-5,5-dimethyl hydantoin, or
1,3-di-(2-hydroxypropyl)-benzimidazolone,
e,m and n being whole numbers.

With the use of such polyester diols the amount of urethane groups within the polyurethane elastomer is reduced and excellent mechanical properties in the temperature range between 60° and 120° C, which for some uses is important, are achieved.

The process according to the invention is characterized in that a maximum of 20% by weight of a diisocyanate are reacted, preferably in the presence of a catalyst, with a diol, the diol comprising at least partially a polyester diol having a molecular weight of between 2000 and 20000 and being formed by reacting a dicarboxylic acid or a derivative thereof and an aliphatic diol and cyclic or heterocyclic diol, respectively, having a molecular weight between 3000 and 30000.

According to a preferred embodiment of the process the polyester diol used has a molecular weight between 4000 and 16000.

Preferred dicarboxylic acids for forming the polyester diol are selected from the group comprising adipic acid, azelaic acid, sebacic acid, maleic acid, terephthalic acid, isophthalic acid and phthalic acid.

For forming the polyester diol, aliphatic diols of the group comprising 1,4-butanediol, diethylene-glycol, 1-methyl ethylene glycol and heterocyclic diols are used.

When the polyester diol is formed from a heterocyclic diol, the diols are selected from the group comprising
Bis-[5,5-dimethyl-3-(2-hydroxyethyl)-hydrontoinyl]-methane
Sebacic acid-di-{1-methyl-2-[3-(2-hydroxyethyl)-4,4-dimethyl-hydantoinyl]-ethyl ester},
1,3-di-(2-hydroxyethyl)-5,5-dimethyl hydantoin,
1,3-di-(2-hydroxyethyl)-benzimidazolone,
1,3-di-(2-hydroxyethyl)-4,5,6,7-tetrabromobenzimidazolone,
1,3-di-(2-hydroxyethyl)-4,5,6,7-tetrahydrobenzimidazolone,
Bis-[5,5-dimethyl-3-(2-hydroxypropyl)-hydantoinyl]-methane,
1,3-di-(2-hydroxypropyl)-5,5-dimethyl hydantoin, and
1,3-di-(2-hydroxypropyl)-benzimidazolone.

Preferably the reaction is carried out in the presence of a catalyst selected from the group comprising tin octoate, tin dibutyllaurate, 1,4-diazabicyclo-[2,2,2]-octane.

The invention will now be described in detail.

PREPARATION OF THE POLYESTER DIOLS

EXAMPLE 1

74.4g (1.2 moles) ethylene glycol, 241.4g (1.7 moles) adipic acid and 213.6g (0.6 moles) Bis-[5,5-dimethyl-3-(2-hydroxy ethyl)-hydantoinyl]-methane were heated for 24 hours at 180° C and for 12 hours at 180° C/1mm Hg, whereby the water generated during the reaction was continuously removed from the reaction mixture.

The polyester diol obtained having a molecular weight of about 5000 was used in the preparation of polyurethane elastomers as described later.

EXAMPLE 2

14.88g (0.24 moles) ethylene glycol, 51.1g (0.35 moles) adipic acid, 42.72g (0.12 moles) Bis-[5,5-dimethyl-3-(2-hydroxy-ethyl)-hydantoin]-methane and 0.3g p-toluenesulfonic acid were reacted as described in Example 1. A polyester diol having a molecular weight of about 1000 was obtained.

EXAMPLE 3

20.44g (0.14 moles) adipic acid, 56.96g Bis-{1-methyl-2-[1-(2-hydroxymethyl)-5,5-dimethyl-hydantoin-3-yl]}-ethyl sebacate and 0.6g p-toluene-sulfonic acid were reacted as described in Example 1. A polyester diol having a molecular weight of about 11000 was obtained.

EXAMPLE 4

33.58g (0.23 moles) adipic acid, 0.98g (0.01 moles) maleic acid anhydride, 9.92g (0.16 moles) ethylene glycol and 28.49g Bis-[5,5-dimethyl-3-(2-hydroxymethyl)-hydantoinyl]-methane were heated for 24 hours at 180° C, 6 hours at 220° C and 10 hours at 180° C/1 mm Hg, whereby the water generated during the reaction was continuously removed from the reaction mixture. A polyester diol having a molecular weight of about 6000 was obtained.

EXAMPLE 5

37.96g (0.26 moles), adipic acid, 11.16g (0.18 moles) ethylene glycol and 19.44g (0.09 moles) 1,3-di-(2-hydroxyethyl)-5,5-dimethyl hydantoin were heated for 24 hours at 180° C and 12 hours at 220° C, the water formed during the reaction was removed by distillation. A polyester diol having a molecular weight of about 6000 was obtained.

EXAMPLE 6

31.96g (0.17 moles) azelaic acid, 7.44g (0.12 moles) ethylene gylcol and 21.36g (0.06 moles) Bis-[5,5-dimethyl-3-(2-hydroxyethyl)-hydantoin]-methane were reacted in the way as described in Example 5. The obtained polyester diol had a molecular weight of about 5500.

EXAMPLE 7

43.24g (0.23 moles) azelaic acid, 9.92g (0.16 moles) ethylene glycol and 23.04g (0.08 moles) 4,4'-di-(2-hydroxyethoxy)-diphenyl methane were reacted as described in Example 5 to obtain a polyester diol having a molecular weight of about 4500.

EXAMPLE 8

3.8g (0.026 moles) adipic acid, 1.12g (0.018 moles) ethylene glycol, 1.94g (0.009 moles) 1,3-di-(2-hydroxyethyl)-5,5-dimethyl hydantoin were heated 20 hours under reflux in an apparatus equipped with a water trap. Then the toluene was removed under vacuum. A polyester diol having a molecular weight of about 6000 was obtained.

EXAMPLE 9

A solution of 37.96g (0.26 moles) adipic acid, 11.16g (0.18 moles) ethylene glycol and 32.04g (0.09 moles) Bis-[5,5-dimethyl-3-(2-hydroxyethyl)-hydantoinyl]-methane in 100ml toluene was heated in the presence of 0.5g $CaCl_2$ for 48 hours under reflux, the water formed being removed.

The toluene was removed under vacuum. A polyester diol having a molecular weight of about 7000 was obtained.

EXAMPLE 10

78.3g (0.43 moles) adipic-acid-dimethyl ester, 30.5g (0.334 moles) 1,4-butanediol, 54.4g (0.15 moles) bis-[5,5-dimethyl-3-(2-hydroxyethyl)-hydantoinyl]-methane and 0.15g antimonyoxide were heated for 1 hour at 150° C, 1 hour at 220° C and 3 hours at 280° C/0.02 mm Hg, whereby methanol generated during reaction was continuously removed from the reaction mixture. A polyesterdiol was formed having a molecular weight of about 4400.

PREPARATION OF THE POLYURETHANE ELASTOMERS

EXAMPLE 11

5000g of the polyester diol prepared according to Example 1 were reacted with 500g (2 moles) diphenylmethane-4,4'-diisocyanate to give a polyurethane prepolymer. The reaction was carried out in a 20 liter steel reactor and the polyester diol was added slowly with stirring to diisocyanate heated at 100° C.

The reaction was terminated by maintaining the temperature at 100° C for an additional 6 hours.

Finally, to the polymer were added 267g (1 mole) 3,3'-dichloro-4,4'-diamino diphenyl methane, heated at 120° C, as lengthening component and 30g phenyl-mercury-propionate as catalyst. The well homogenized mixture was then introduced in a mold heated at 50° C to form therein a polyurethane elastomer. The tests showed a marked improvement of the resistance to continuous tearing at 100° C and of the alternating bending strength within the temperature range of 60° to 90° C. Because of the catalyst added in form of the mercury compound the polymer had also fungus resistive properties.

EXAMPLE 12

500g 1,3-di-(2-hydroxyethyl)-4,5,6,7-tetrabromobenzimidazolone and 460g 3-isocyanatomethyl-3,5,5-trimethyl cyclohexyl isocyanate were heated at 240° C with stirring in a reactor to produce a polyurethane prepolymer. After 10 minutes the prepolymer was cooled to 120° C and mixed under a nitrogen atmosphere with 6000g of the polyester diol (also heated at 120° C) obtained according to Example 4 and then poured into a mold heated at 100° C. The obtained elastomer was subjected to a posttempering at 106° C for 16 hours and then taken out of the mold and cooled. The obtained product was hardly flammable and because of its good resistance to continuous tearing at temperatures above 80° C was particularly suitable for use in articles subjected to dynamic stresses and exposed to high temperatures.

EXAMPLE 13

16000g of the polyester diol according to Example 2 were combined with 250g naphthylene-4,3-diisocyanate at 180° C with exclusion of air in an extruder heated at 180° C and injected into a mold heated at 110° C. The mold was cooled, the body taken out of the mold and subjected to posttempering for 24 hours at 105° C in a hot air operated oven.

The polyurethane elastomer was in the shape of the mold. When the body was tested it showed excellent resistance against dynamic permanent stress in the temperature range of 60° to 100° C.

EXAMPLE 14

4500g of the polyester diol according to Example 7 were combined with 486g hexamethylene-1,6-diisocyanate at 80° C and mixed rapidly with 18g tin dibutyl dilaurate and 45g 1,4-diazabicyclo-2,2,2-octane and

What I claim is:

1. A reaction product of a polyester diol having a molecular weight of about 5000 and diphenyl methane-4,4'-diisocyanate in an amount of about 2 moles of the diisocyanate to about 1 mole of the polyester diol, the polyester diol being formed by the reaction of 1.2 moles of ethylene glycol, 1.7 moles of adipic acid and 0.6 moles of BIS-[5,5-dimethyl-3-(2-hydroxy ethyl)-hydantoinyl] methane.

2. A polyurethane elastomer comprising the reaction product of (a) a polyester diol having a molecular weight of 3000 to 30,000 of the formula:

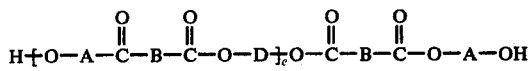

wherein A is D, $+(CH_2)_mO+_n$ or

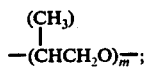

B is $+CH_2+_4-$, $-(CH_2)_7-$, $-(CH_2)_8-$, $-CH=CH-$, o-phenylene, m-phenylene or p-phenylene;

D is a bivalent radical formed by removing the hydroxyl group from one of the following heterocyclic diols:
Bis-[5,5-dimethyl-3-(2-hydroxyethyl)-hydantoinyl]-methane,
1,3-di-(2-hydroxyethyl)-5,5-dimethyl hydantoin,
1,3-di-(2-hydroxyethyl)-benzimidazolone,
1,3-di-(2-hydroxyethyl)-4,5,6,7-tetrabromo benzimidazolone,
1,3-di-(2-hydroxyethyl)-4,5,6,7-tetrahydro benzimidazolone,
Bis-[5,5-dimethyl-3-(2-hydroxypropyl)-hydantoinyl]-methane,
1,3-di-(2-hydroxypropyl)-5,5-dimethyl hydantoin, or
1,3-di-(2-hydroxypropyl)-benzimidazolone; and
$e$, $m$ and $n$ are whole numbers; and
wherein the polyester diol is the reaction product of a dicarboxylic acid selected from the group consisting of adipic acid, azelaic acid, sebacic acid, maleic acid, phthalic acid, isophthalic acid, and terephthalic acid; and aliphatic diol selected from the group consisting of ethylene glycol, 1,4-butanediol, and 1,2-propanediol and the heterocyclic diol wherein the molar ratio of the dicarboxylic acid, the aliphatic diol and the heterocyclic diol is respectively about 2.8 to 2 to 1; and (b) maximally up to 20% by weight of a diisocyanate.

3. A polyurethane elastomer defined in clain 2 wherein the polyester diol (a) has a molecular weight between 4000 and 16,000.